(12) United States Patent
Smith et al.

(10) Patent No.: US 11,835,102 B2
(45) Date of Patent: Dec. 5, 2023

(54) BRAKE PISTON WITH FOOTING

(71) Applicant: HL MANDO CORPORATION, Gyeonggi-do (KR)

(72) Inventors: Daniel Smith, Bay City, MI (US); HyungJin Baek, Bay City, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 152 days.

(21) Appl. No.: 17/221,692

(22) Filed: Apr. 2, 2021

(65) Prior Publication Data
US 2022/0316539 A1 Oct. 6, 2022

(51) Int. Cl.
*F16D 65/18* (2006.01)
*F16D 125/40* (2012.01)
*F16D 121/04* (2012.01)
*F16D 123/00* (2012.01)
*F16D 125/06* (2012.01)

(52) U.S. Cl.
CPC .......... *F16D 65/18* (2013.01); *F16D 2121/04* (2013.01); *F16D 2123/00* (2013.01); *F16D 2125/06* (2013.01); *F16D 2125/40* (2013.01)

(58) Field of Classification Search
CPC .. F16D 65/18; F16D 2121/04; F16D 2123/00; F16D 2125/06; F16D 2125/40
See application file for complete search history.

(56) References Cited

U.S. PATENT DOCUMENTS

| | | | |
|---|---|---|---|
| 6,382,367 B1 * | 5/2002 | Varzescu | F16D 65/567 188/73.1 |
| 9,850,971 B1 * | 12/2017 | Demorais | F16D 65/18 |
| 2012/0181123 A1 * | 7/2012 | Ruiz | F16D 65/0068 92/172 |
| 2017/0023079 A1 * | 1/2017 | DeMorais | F16D 65/18 |
| 2018/0010659 A1 * | 1/2018 | Kuridza | F16D 65/18 |
| 2018/0298963 A1 * | 10/2018 | Demorais | F16D 55/225 |
| 2019/0316644 A1 * | 10/2019 | Demorais | F16D 65/18 |
| 2020/0158198 A1 | 5/2020 | Smith et al. | |
| 2022/0163076 A1 * | 5/2022 | Fawcett | F16D 65/18 |

* cited by examiner

*Primary Examiner* — Nicholas J Lane
(74) *Attorney, Agent, or Firm* — Ladas & Parry, LLP (57) ABSTRACT

A brake piston system configured for use in a brake system is disclosed. The brake piston system can include: a piston body; a piston footing positioned at a first end of the piston body and configured to transfer a braking force to a brake pad; an o-ring positioned between the piston footing and the piston body. Embodiments of the brake piston system can include a plastic (e.g. phenolic) piston body and a metal (e.g. steel) footing and can reduce fluid hold-up in and weight of the piston system.

20 Claims, 9 Drawing Sheets

BRAKE PISTON WITH FOOTING

TECHNICAL FIELD

This disclosure relates to brake systems, such as vehicular brake systems, that include a piston for operation of the braking system.

BACKGROUND

Brake systems, such as disk brake systems on vehicles such as cars and trucks, can include a caliper housing and one or more pistons within the caliper housing. In operation, the disk brake system can cause brake pads to press against opposite contact surfaces of a brake rotor in order to generate tangential friction force to cause a braking effect. The disk brake system can include a piston which in response to a signal moves against a brake pad to cause a braking effect.

SUMMARY

In a first aspect disclosed herein, a brake piston system is provided. The brake piston system comprising: a piston body; a piston footing positioned at a first end of the piston body and configured to transfer a braking force to a brake pad, the piston footing comprising a footing extension extending into an inner space of the piston body, the footing extension comprising an inner surface configured to engage a surface of a spindle nut and stop relative rotation of the spindle nut and the footing extension.

In a first embodiment of the first aspect, the piston body comprises an interior space defined by an inner wall with the interior space extending from a first opening in the first end to a second opening in the second end, the second end being opposite the first end.

In a second embodiment of the first aspect, the piston body comprises an interior space defined by an inner wall with the interior space extending from a first opening in the first end to a second opening in the second end, the second end being opposite the first end and the footing covers the first opening and an o-ring creates a seal between the piston footing and the piston body to contain brake fluid.

In a third embodiment of the first aspect, the brake piston system further comprises one or more fasteners that attach the piston footing to the piston body.

In a fourth embodiment of the first aspect, the brake piston system further comprises one or more fasteners that attach the piston footing to the piston body and the fastener is selected from the group consisting of screws, pins and clips.

In a fifth embodiment of the first aspect, the piston body comprises an interior space defined by an inner wall with the interior space extending from a first opening in the first end to a second opening in the second end, the second end being opposite the first end, and the brake piston system further comprises a spindle and a spindle nut, wherein the spindle and spindle nut are located at least partially within the interior space.

In a sixth embodiment of the first aspect, the piston body is a polymeric material and the piston footing is a metal.

In a seventh embodiment of the first aspect, the piston body is a polymeric material and the piston footing is a metal and the piston body is phenolic and the piston footing is steel.

In an eighth embodiment of the first aspect, the footing comprises a first and a second piston bearing surface that are configured to contact the piston body and through which during a braking operation, the force on the piston body is transferred to the footing, wherein the first bearing surface is located radially and axially apart from the second bearing surface.

In a ninth embodiment of the first aspect, the brake piston system further comprising an o-ring positioned between the piston footing and the piston body, wherein the piston body comprises an interior space defined by an inner wall with the interior space extending from a first opening in the first end to a second opening in the second end, the second end being opposite the first end, and the o-ring contacts the interior wall and a surface of the footing such that the o-ring resists separation of the footing from the piston body.

In a tenth embodiment of the first aspect, the piston body comprises an interior space defined by an inner wall with the interior space extending from a first opening in the first end to a second opening in the second end, the second end being opposite the first end, and the o-ring contacts the interior wall and a surface of the footing such that the o-ring resists separation of the footing from the piston body, and the o-ring also contacts a portion of the interior wall that interfaces with a bearing surface of the footing.

In an eleventh embodiment of the first aspect, the brake piston system further comprises a lock recess, wherein the lock recess is configured to receive a lock protrusion from a brake pad or brake pad backing plate to prevent relative rotation of the footing and the brake pad or brake pad backing plate.

In a twelfth embodiment of the first aspect, the brake piston system further comprises a lock protrusion, wherein the lock protrusion is configured to engage a lock recess in a brake pad or brake pad backing plate to prevent relative rotation of the footing and the brake pad or brake pad backing plate.

In a second aspect, a method of operating a brake piston system is provided. The method comprising operating a brake piston system comprising: a piston body; a piston footing positioned at a first end of the piston body and configured to transfer a braking force to a brake pad; an o-ring positioned between the piston footing and the piston body by performing steps including exerting a force against the brake piston system which moves the brake piston footing against a brake pad assembly comprising the brake pad which causes the brake pad to exert a braking force against a brake rotor.

In a first embodiment of the second aspect, the force is generated by rotation of spindle within the spindle nut to move the spindle nut against the footing, and rotation of the spindle nut in relation to the footing is stopped by corresponding surfaces on the spindle nut and the footing contacting one another.

In a second embodiment of the second aspect, the force is a hydraulic force that pushes on the brake piston body and the brake piston footing.

In a third embodiment of the second aspect, the force is applied by rotating a spindle within a spindle nut, where the spindle nut is held within an interior space of the piston body system causing the spindle nut and brake piston system against the brake pad assembly which causes the brake pad to exert a braking force against the brake rotor.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The present disclosure relates to disk brake caliper pistons and piston systems, such as are used for various vehicles including automobiles, trucks, aircraft and the like. Embodiments of the disclosure include brake pistons having a piston body and a piston footing. The piston body and piston footing can be separable from one another (or not) and can be assembled together with optional other parts into a brake piston system.

The piston body and piston footing can be any suitable material, compatible with the forces and environment presented to the brake piston system in a relevant brake system. Suitable materials for the brake piston body can include plastics, such as phenolic plastics, or metals or ceramics. It can be desirable to utilize a lightweight material, such as a lightweight plastic (e.g. phenolic plastics) or lightweight metals in order to reduce the mass of the brake piston and increase the responsiveness and feel of the brake system the brake piston system is installed in. It can also be desirable to size and configure the piston body and/or the footing to reduce the hold-up volume of the inner space of the piston body and overall brake piston system so that less brake fluid will be present within the brake piston system. Reduction of hold-up volume can improve brake responsiveness and brake feel, such as by reducing the amount of brake fluid heated by breaking operations and by reducing the amount of brake fluid present within the piston that can be subject to compression during braking operation.

The footing can be any suitable material, but preferred materials include metals, ceramics and plastics suitable for the forces, temperatures and environment that the footing will be exposed to. Preferred materials can include metals, such as steel, ceramics, such as carbides, nitrides and oxides.

In some embodiments, a seal can be present between the piston body and the footing. Such a seal can provide a seal against leakage of brake fluid and/or can provide a retention means for retaining the footing attached to the piston body, such as during assembly, maintenance and/or operation. In some embodiments, the seal can be an O-ring. Suitable materials for the seal can include resilient materials suitable for the temperature the forces and the environment of the brake system in which the brake piston system is installed. Preferred materials include viton, nitrile, neoprene, silicon, ethylene propylene rubber, PTFE, polyurethane, EPDM, perfluoroelastomer, Chemraz, Kalrez, fluorosilicone, chloroprene, Aflas, and the like, and can be solid, hollow, encapsulated, etc.

Figure 1:
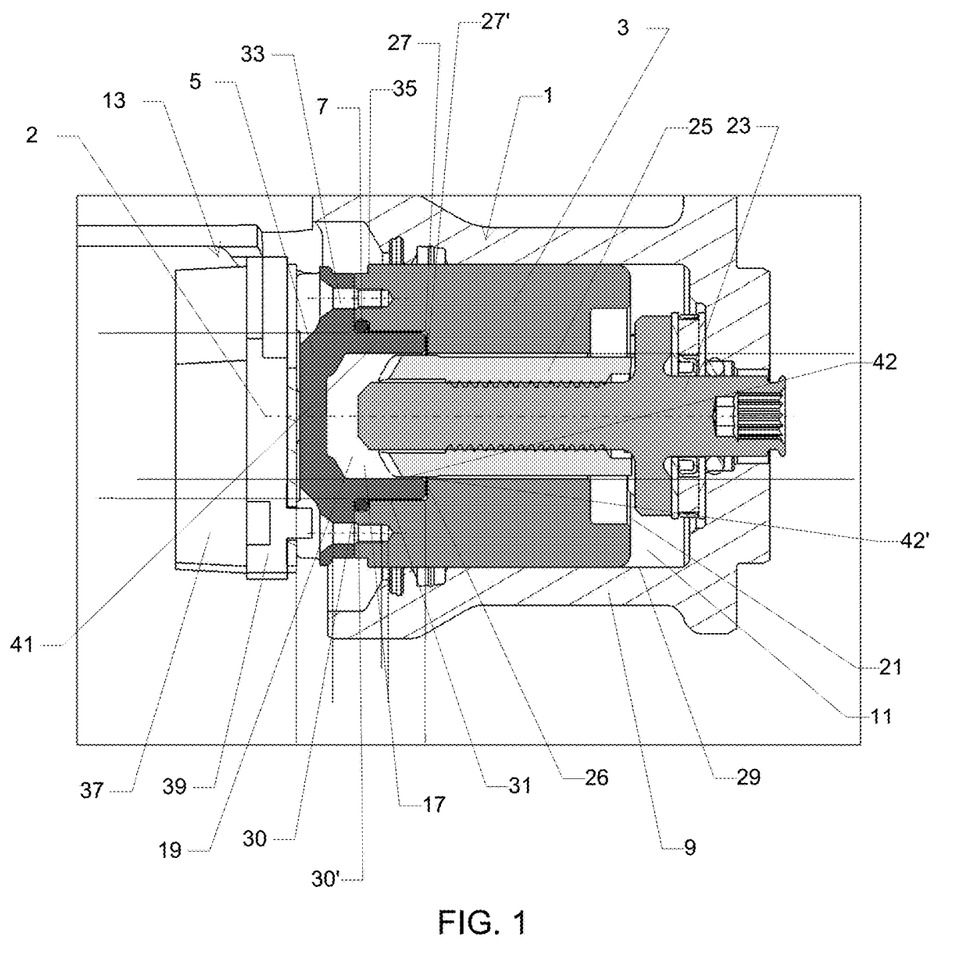
FIG. 1 shows a cross-sectional view of a first embodiment of a brake piston assembly in an embodiment of a brake system.

One embodiment of a brake piston system 1 is shown in FIG. 1. In FIG. 1, a piston body 3 is assembled to a footing 5. The piston body 3 has an inner space 17 which is defined by an inner wall 29. The inner space 17 extends from a first opening 19 to a second opening 21 at opposite ends of the piston body 3. The footing 5 is shown to close the inner space 17 at the first opening 19 and act as a contact surface for the piston with the brake pad backing plate 39. In some embodiments, the footing 5 comprises a footing extension 41 that extends into the inner space 17 of the piston body 3. In the devices described herein, the inner space 17 can extend into the footing extension 41 and optionally beyond the piston body 3 into the footing 5 or the footing 5 can close the inner space 17 at the end of the piston body 5 or within the piston body 5. The footing extension 41 can include and inner surface 42 that is configured to interact with an outer surface 42' of a spindle nut 3 that prevents relative rotation of the spindle nut 3 and the footing 5. An optional seal, shown as an O-ring 7, is shown at the junction of the footing 5 and the piston body 3. The seal, such as in O-ring 7, can be used to hold the footing 5 in place in the piston body 3. In some embodiments, the retention capability of the seal can be accomplished by way of the friction of the seal acting upon the footing 5 and the piston body 3.

As shown in FIG. 1, the interface between the piston body 3 and the footing can include a step where there is a first bearing surface 27 of the footing 5 contacting a first bearing surface 27' of the piston body 3 and a second bearing surface 30 of the footing contacting a second bearing surface 30' of the piston body 3. As shown in FIG. 1, these bearing services can be offset from one another both radially (further or closer to the central axis 2) and axially (displaced to different locations along the central axis 2.) The step 26 can be located proximate the second bearing surface 30' or distal the second bearing surface 30'. Location of the step 26 proximate the second bearing surface 30' can be advantageous in that less material can be used for the footing 5, such as by utilizing a shorter footing extension 41 that extends into the inner space 17 than when the step 26 is located distal the second bearing surface 30'. A shorter footing extension 41 can reduce the weight of the piston by utilizing less heavy material, such as steel for the footing 5, and more of a lighter material, such as phenolic, for the piston body 3, or by allowing a larger internal space 17. In some embodiments, the step 26 can be located 5% or 10% or 20% or 30% or 40% or 50% or 60% or 70% or 80% or 90% or 95% of the length of the piston body 5. In some embodiments, the step 26 can be adjacent to the second bearing surface 30' or the first bearing surface 30.

Relative rotation between the spindle nut and piston can be controlled by the use of corresponding surfaces on the spindle nut 25 and the footing 5 which contact one another directly or indirectly and serve to limit or prevent relative rotation. In one embodiment shown in FIGS. 1, 2 and 3, the footing extension 41 includes an inner surface 42' that interacts with an outer surface 42 of the spindle nut 25, where the interaction occurs at a flat or planar region.

However, other shapes can be used to achieve the anti-rotation, such as curved surfaces and combinations of curved and planar surfaces and combinations of curved surfaces.

Figure 2:
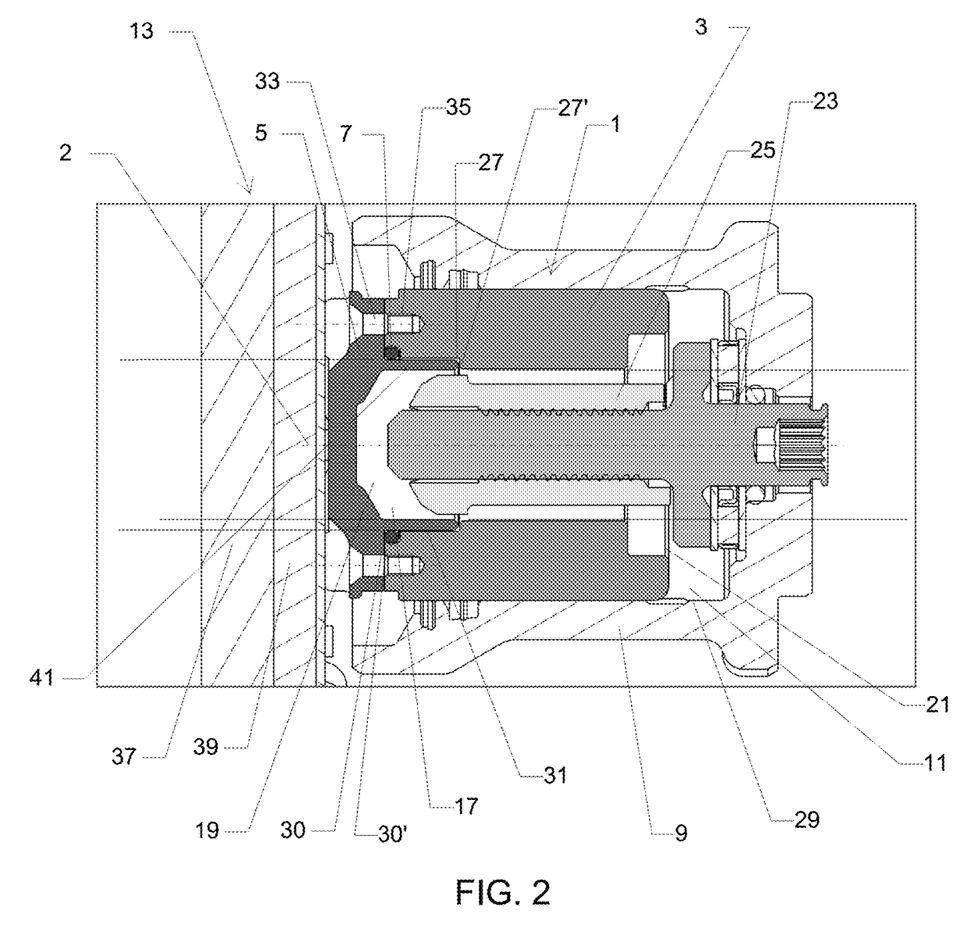
FIG. 2 shows a second cross-sectional view of a first embodiment of a brake piston assembly in an embodiment of a brake system.
Figure 3:
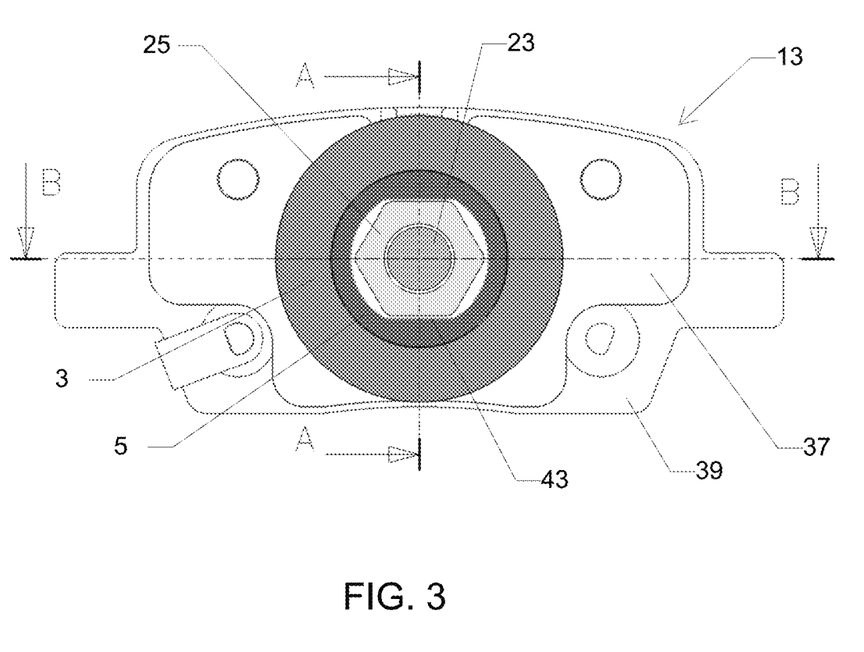
FIG. 3 shows an end cross-sectional end view of a first embodiment of a brake piston assembly in an embodiment of a brake system.

In some embodiments, the spindle nut 25 and piston body 3 can include surfaces that interact with one another to prevent relative rotation. FIGS. 1, 2 and 3 show one embodiment of the spindle nut 25 that interacts with the piston body 3 to prevent relative rotation. In FIGS. 1, 2 and 3, the surface(s) of the spindle nut 25 that interact with the surfaces of the piston body 3 also interact with surfaces of the footing 41 when the spindle nut is fully retracted (e.g. parking brake is released.) When the spindle nut 25 is extended into the footing 41 (e.g. parking brake is engaged), in some embodiments the spindle nut moves and with sufficient movement, the surfaces of the spindle nut that interact with the footing and/or piston body to prevent relative rotation only engage surfaces of the footing. In some embodiments, when the spindle nut is fully extended into the footing, the surfaces of the spindle nut that interact with the footing and/or piston body to prevent relative rotation only interact with the footing or in other embodiments interact with the piston body and the footing. In some embodiments, when the spindle nut 25 is fully retracted, the surfaces of the spindle nut that interact with the footing and/or piston body to prevent relative rotation only interact with the footing or only interact with the piston body.

Figure 7:
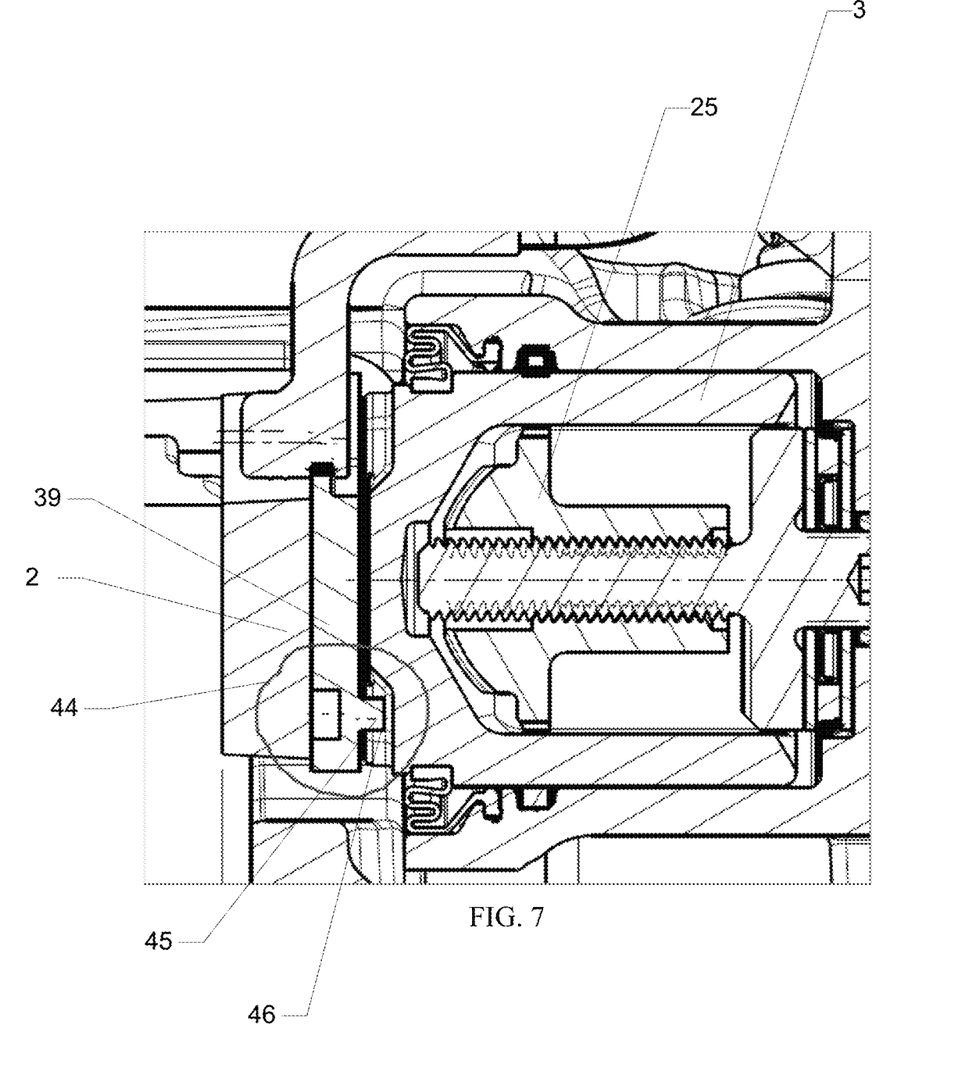
FIG. 7 shows an embodiment of a lock in an embodiment of a brake system.

In some embodiments, an optional lock 44 can be included to prevent or limit relative rotation between the brake pad 2 and the footing 41 or piston body 3. In some such embodiments, the lock 44 can be utilized as interacting between the brake pad backing plate 39 and the footing 41. FIG. 7 shows a lock 44 acts between the brake pad backing plate 39 and a piston body 3 in a system that utilizes a piston body without a footing. In additional embodiments, the lock can act between the brake pad backing plate 39 and the footing 41 or between the brake pad 2 and the footing 41 or between the brake pad 2 and the piston body 3.

Figure 8:
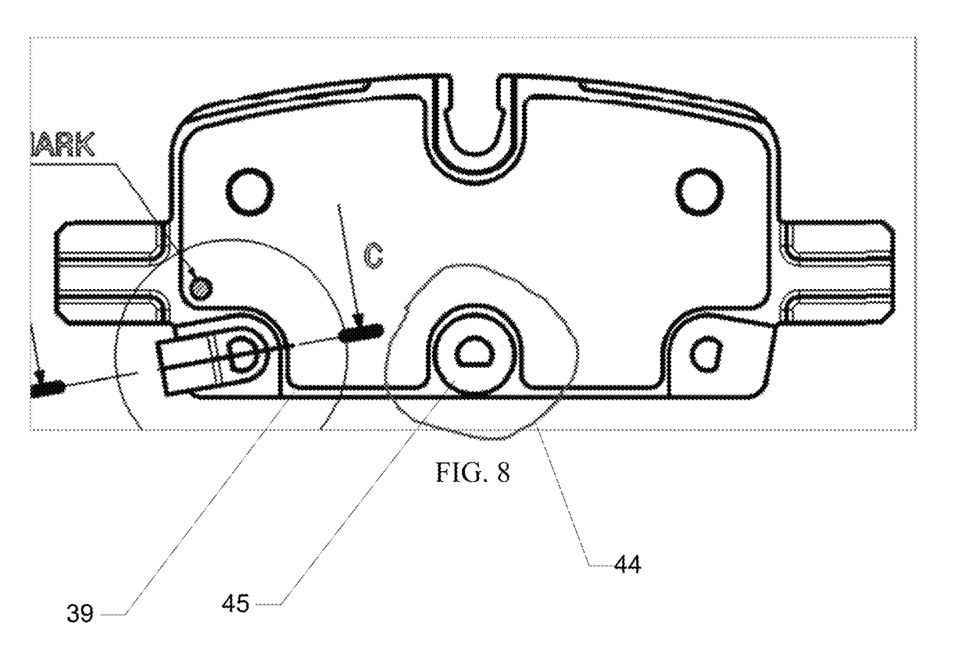
FIG. 8 shows an embodiment of a lock feature in and embodiment of a brake pad.
Figure 9:
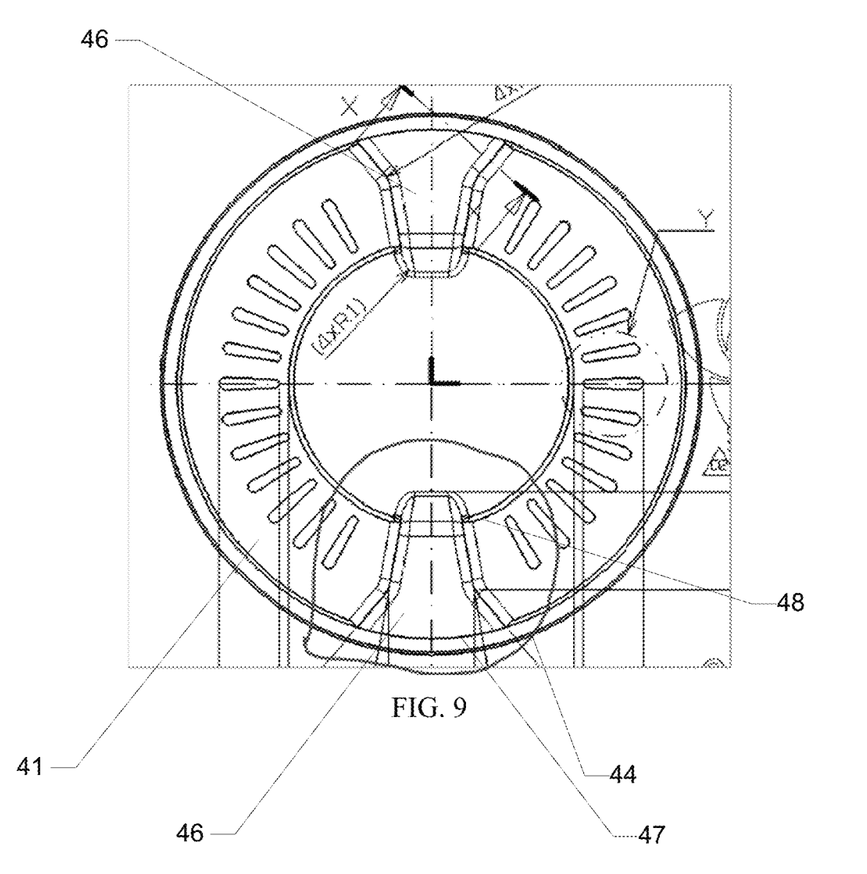
FIG. 9 shows an embodiment of a lock feature in an embodiment of a brake piston or footing.

FIGS. 8 and 9 show embodiments of a lock 44 in the brake pad backing plate 39 (FIG. 8) and the footing 41 (FIG. 9.)

The lock 44 can comprise a protrusion 45 and a lock recess 46, such as shown in FIG. 7. In the embodiment of FIG. 7, the protrusion 45 extends from the brake pad backing plate 39 toward the footing 41 and is received into the recess 46 in the footing 41. In some embodiments, a protrusion 45 can extend from a brake pad 2 and a corresponding recess can be present in the footing 41. In some embodiments, a protrusion 45 can be located on the footing 41 and a corresponding recess 46 on the brake pad backing plate 39.

A lock protrusion 45 can have any suitable shape for interacting with a recess 46 to limit or prevent relative rotation between the brake pad or brake pad backing plate and the footing or piston body. In some embodiments, the protrusion 45 can have a round, triangular, rectangular shape or some other shape such as a polygon with straight or curved sides or a combination of straight and curved sides. In some embodiments, the recess 46 can be round, triangular, rectangular or some other shape such as a polygon with straight or curved sides or a combination of straight and curved sides. The recess 46 can have a shape that is the same as the corresponding protrusion 45 or a different shape that is capable of receiving the protrusion 45. In some embodiments, the recess 46 can be isolated from an edge of part that the recess is in, such as the footing or brake pad or brake pad backing plate, such that the recess does not intersect the edge an edge of the part. In some embodiments, the recess can intersect an edge of the part the recess is in so as to form a slot into the part. In some embodiments, the recess can intersect more than one edge of the part that the recess is in so as to form a slot through the part. FIG. 9 shows an embodiment of a recess 46 where the recess intersects the outer edge 47 of the footing 41 and an internal edge 48 in the face of the footing 41. In some embodiments, there can be more than one recess 46, such as the two recesses shown in FIG. 9. In some embodiments there can be more than one protrusion. In some embodiments there can be an equal or greater number of recesses as protrusions.

In some embodiments of a brake piston system 1, an optional fastener can be utilized to hold the footing 5 and piston body 3 in an assembled form. Examples of suitable fasteners can include screws, pins, clips or other suitable retaining mechanisms. In the Embodiment of FIG. 1, a screw 33 passes through the footing 5 into the piston body 3. Other types of connectors can also be used in a similar fashion by passing through the footing 5 and into the piston body 3. As shown in FIG. 1, the optional fasteners are shown in use with a seal 7. However, in some embodiments, a seal can be used without optional fasteners 33 or optional fasteners 33 can be used without a seal 7. In additional further embodiments, other means of attaching the footing 5 to the piston body 3 can be utilized without fasteners 33 or seals 7. Some such embodiments include press fitting the footing 5 into the piston body 3 or assembling the footing 5 and piston body 3 with an adhesive or cement.

FIG. 1 also shows the brake piston system 1 assembled into a brake system with the brake piston system 1 located within a piston cylinder 11 of a caliper housing 9. A spindle 23 and spindle not 25 are positioned at least partially within the inner space 17 of the brake piston system 1 and having the spindle accessible to a parking brake system such as by having a portion of the spindle 23 located within an opening in the caliper housing 9 such as by having a portion of the spindle 23 positioned within an opening of the caliper housing 9 and in some embodiments by passing through caliper housing 9.

Also shown in the brake system of FIG. 1 is a brake pad assembly 13 comprising a brake pad 37 in a brake pad backing plate 39. The footing 5 is positioned to be able to push the brake pad assembly 13 such as by contacting the brake pad backing plate 39 and pushing the brake pad backing plate 39 when the brake piston system 1 is moved within the piston cylinder 11 during a braking operation. When the brake is released, the brake piston system 1 retracts within the piston cylinder 11 and the brake pad assembly 13 retracts from the brake rotor. In some embodiments, the retraction can be active, meaning that the brake piston system 1 is attached to the brake pad assembly 13, directly or indirectly, and when the brake piston system 1 retracts, the brake pad assembly 13 is pulled away from the rotor by the brake piston system 1. In some embodiments, the retraction can be passive, such as where there is contact, directly or indirectly between the brake pad assembly 13 and the brake piston system 1 but not a connection that would allow the brake piston system 1 to pull the brake pad assembly 13 as the brake piston system 1 retracts.

FIG. 2 is a different cross-sectional view of the embodiment of a brake piston system of FIG. 1. Visible within FIG. 2 are the piston body 3, the footing 5, spindle 23, spindle not 25 and other elements of FIG. 1. Notable is the difference in thickness of the footing extension 41 and FIG. 2 compared to FIG. 1. The difference in thickness, with the footing extension 41 shown thicker in FIG. 1 then in FIG. 2 is due to the shape of the inner bore of the footing, as shown in FIG. 3. FIG. 3 shows an end cross-sectional view of the piston system 1 of FIGS. 1 and 2 with Section A-A corresponding to FIG. 1 and Section B-corresponding to FIG. 2. Here, the footing 5 can be seen to have antirotation features 43 that interface with the shape of the spindle nut 23 to prevent relative rotation of the spindle nut 23 in relation to the footing 5. Generally, the shape of the inner bore of the footing 5 can have a shape that corresponds to the shape of the spindle nut 25. In FIG. 3, flats are shown as antirotation feature 43.

Figure 4:
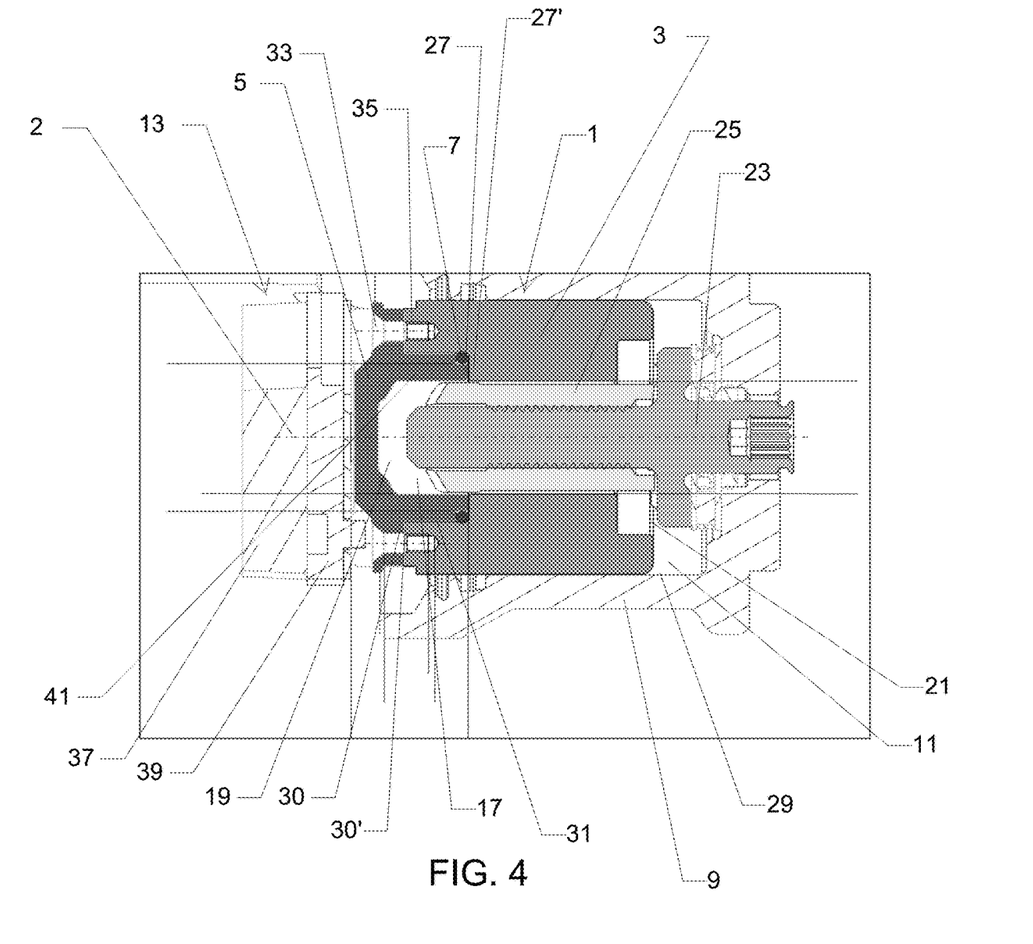
FIG. 4 shows a cross-sectional view of a second embodiment of a brake piston assembly in an embodiment of a brake system.

FIG. 4 shows a second embodiment of a brake piston system 1 with a different location of seal 7 as compared to the embodiment of FIG. 1. In FIG. 1, the seal is located at the first opening 19 of piston body 3. In FIG. 4, the seal 7 is located at the first bearing surface 27' of the piston body.

Figure 5:
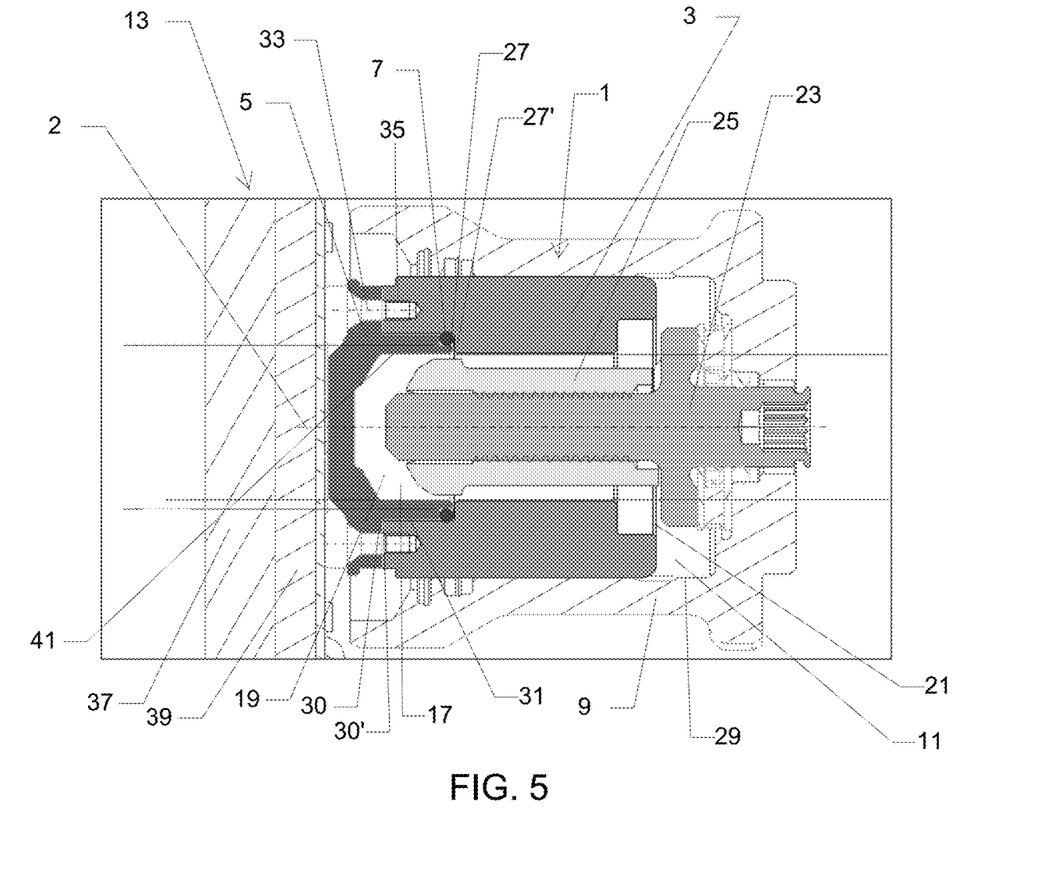
FIG. 5 shows a second cross-sectional view of a second embodiment of a brake piston assembly in an embodiment of a brake system.
Figure 6:
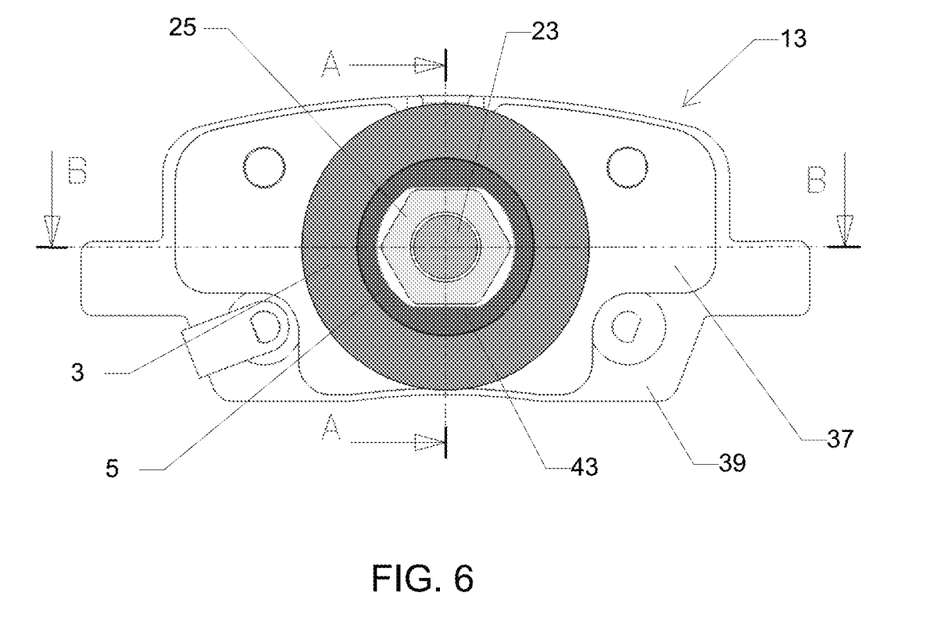
FIG. 6 shows an end cross-sectional end view of a second embodiment of a brake piston assembly in an embodiment of a brake system.

FIG. 5 is a different cross-sectional view of the embodiment of a brake piston system 1 shown in FIG. 4. As with FIGS. 1 and two, FIGS. 4 and 5 differ in the thickness of the footing extension 41 shown in the respective drawings. FIG. 6 is an end cross-sectional view of the embodiment of a brake system 1 shown in FIGS. 4 and 5. FIG. 6 shows the location of Section A-A and Section B-B with Section A-A corresponding to FIG. 4 and Section B-B corresponding to FIG. 5. FIG. 6 also shows the antirotation feature 43 and the interfacing of the antirotation feature 43 with the spindle nut 25.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. Use of language such as "approximately", "somewhat", "about", "nearly" and other terms of degree that appear within this disclosure are intended to be interpreted as a person of skill in the art would understand the language based upon the context, with a further understanding that if the context provides insufficient guidance, a tolerance of 20% should be applied. Use of the word "or" should be understood to also include the meaning "and", except where the context indicates otherwise. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

The invention claimed is:

1. A brake piston system comprising:
   a piston body; and
   a piston footing positioned at a first end of the piston body and configured to transfer a braking force to a brake pad, the piston footing comprising a footing extension extending into an inner space of the piston body, the footing extension comprising an inner surface configured to engage a surface of a spindle nut and stop relative rotation of the spindle nut and the footing extension, wherein the piston body has a stepped inner surface having a first part and a second part having an inner diameter smaller than the first part, and an o-ring is positioned on the first part of the stepped inner surface of the piston body having an inner diameter larger than the second part of the stepped inner surface of the piston body which is formed at the first end of the piston body closer to the brake pad than a second end of the piston body.

2. The brake piston system of claim 1, wherein the piston body comprises an interior space defined by an inner wall with the interior space extending from a first opening in the first end to a second opening in the second end, the second end being opposite the first end.

3. The brake piston system of claim 2, wherein the footing covers the first opening and the o-ring creates a seal between the piston footing and the piston body to contain brake fluid.

4. The brake piston system of claim 1 further comprising one or more fasteners that attach the piston footing to the piston body.

5. The brake piston system of claim 4, wherein the fastener is selected from the group consisting of screws, pins and clips.

6. The brake piston system of claim 2 further comprising a spindle and a spindle nut, wherein the spindle and spindle nut are located at least partially within the interior space.

7. The brake piston system of claim 1, wherein the piston body is a polymeric material and the piston footing is a metal.

8. The brake piston system of claim 7, wherein the piston body is phenolic and the piston footing is steel.

9. The brake piston system of claim 1, wherein the footing comprises a first and a second piston bearing surface that are configured to contact the piston body and through which during a braking operation, the force on the piston body is transferred to the footing, wherein the first bearing surface is located radially and axially apart from the second bearing surface.

10. The brake piston system of claim 2, wherein the o-ring is positioned between the piston footing and the piston body, and the o-ring contacts the interior wall and a surface of the footing such that the o-ring resists separation of the footing from the piston body.

11. The brake piston system of claim 10, wherein the o-ring also contacts a portion of the interior wall that interfaces with a bearing surface of the footing.

12. The brake piston system of claim 1, further comprising a lock recess, wherein the lock recess is configured to receive a lock protrusion from a brake pad or brake pad backing plate to prevent relative rotation of the footing and the brake pad or brake pad backing plate.

13. The brake piston system of claim 1, further comprising a lock protrusion, wherein the lock protrusion is configured to engage a lock recess in a brake pad or brake pad backing plate to prevent relative rotation of the footing and the brake pad or brake pad backing plate.

14. A method of operating the brake piston system of claim 1, comprising:
exerting a force against the brake piston system which moves the brake piston footing against a brake pad assembly comprising the brake pad which causes the brake pad to exert a braking force against a brake rotor.

15. The method of claim 14, wherein the force is generated by rotation of spindle within the spindle nut to move the spindle nut against the footing, and rotation of the spindle nut in relation to the footing is stopped by corresponding surfaces on the spindle nut and the footing contacting one another.

16. The method of claim 14, wherein the force is a hydraulic force that pushes on the brake piston body and the brake piston footing.

17. The method of claim 14, wherein the force is applied by rotating a spindle within a spindle nut, where the spindle nut is held within an interior space of the piston body system causing the spindle nut and brake piston system against the brake pad assembly which causes the brake pad to exert a braking force against the brake rotor.

18. The brake piston system of claim 1, wherein one end of the piston foot is inserted in the first part of the stepped inner surface of the piston body having the inner diameter larger than the second part of the stepped inner surface of the piston body, such that the one end of the piston foot is supported by a surface formed between the first and second parts of the stepped inner surface of the piston body.

19. The brake piston system of claim 1, wherein the inner surface of the piston footing is on a same plane as the second part of the stepped inner surface of the piston body having the inner diameter smaller than the first part of the stepped inner surface of the piston body.

20. A brake piston system comprising:
a piston body;
a piston footing positioned at a first end of the piston body and configured to transfer a braking force to a brake pad, the piston footing comprising a footing extension extending into an inner space of the piston body, the footing extension comprising an inner surface configured to engage a surface of a spindle nut and stop relative rotation of the spindle nut and the footing extension; and
one or more fasteners that attach the piston footing to the piston body,
wherein the footing comprises a first and a second piston bearing surface that are configured to contact the piston body and through which during a braking operation, the force on the piston body is transferred to the footing, wherein the first bearing surface is located radially and axially apart from the second bearing surface, and
wherein an o-ring is positioned adjacent to the first or second piston bearing surface.

* * * * *